(12) United States Patent
Shibata

(10) Patent No.: US 10,110,774 B2
(45) Date of Patent: Oct. 23, 2018

(54) COMMUNICATION APPARATUS

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/670,153

(22) Filed: Aug. 7, 2017

(65) Prior Publication Data

US 2018/0048785 A1  Feb. 15, 2018

(30) Foreign Application Priority Data

Aug. 10, 2016 (JP) .................................. 2016-157310

(51) Int. Cl.
  *G06F 3/12*  (2006.01)
  *H04N 1/327*  (2006.01)
  *H04W 76/14*  (2018.01)
  *H04N 1/00*  (2006.01)
  (Continued)

(52) U.S. Cl.
  CPC ..... *H04N 1/32765* (2013.01); *H04N 1/00278* (2013.01); *H04N 1/00315* (2013.01); *H04N 1/32122* (2013.01); *H04W 8/26* (2013.01); *H04W 76/14* (2018.02); *H04N 2201/0031* (2013.01); *H04N 2201/0039* (2013.01);
  (Continued)

(58) Field of Classification Search
  CPC ........... H04N 1/32765; H04N 1/00278; H04N 1/00315; H04N 1/32122; H04N 2201/0031; H04N 2201/0039; H04N 2201/0055; H04N 2201/3208; H04W 76/14; H04W 8/26

USPC ....................................................... 358/1.15
  See application file for complete search history.

(56) References Cited

U.S. PATENT DOCUMENTS

2009/0046686 A1  2/2009  Izaki
2013/0260683 A1  10/2013 Suzuki et al.
(Continued)

FOREIGN PATENT DOCUMENTS

JP  2014-078966 A  5/2014

OTHER PUBLICATIONS

Wi-Fi Alliance Technical Committee P2P Task Group, "Wi-Fi Peer-to Peer (P2P) Technical Specification", Version 1.1 pp. 1-159, 2010.

*Primary Examiner* — Neil R McLean
(74) *Attorney, Agent, or Firm* — Banner & Witcoff, Ltd.

(57) ABSTRACT

A communication apparatus may perform: constructing a first wireless network to which the communication apparatus and an external apparatus belong and an access point does not belong; receiving, from the external apparatus by using the constructed first wireless network, a wireless setting used in a second wireless network, the second wireless network being a network to which the communication apparatus, the external apparatus, and the access point are to belong; establishing a wireless connection with the access point by using the received wireless setting; obtaining a first IP address of the communication apparatus in the second wireless network; sending the obtained first IP address to the external apparatus by using the first wireless network after the wireless connection with the access point has been established; and receiving a signal from the external apparatus via the access point by using the second wireless network.

19 Claims, 8 Drawing Sheets

(51) Int. Cl.
*H04N 1/32* (2006.01)
*H04W 8/26* (2009.01)

(52) U.S. Cl.
CPC ............... *H04N 2201/0055* (2013.01); *H04N 2201/3208* (2013.01)

(56) References Cited

U.S. PATENT DOCUMENTS

2017/0118376 A1* 4/2017 Hosoda .............. H04N 1/32765
2017/0230536 A1* 8/2017 Haapanen .......... H04N 1/32765

\* cited by examiner

FIG. 2 (First Embodiment)

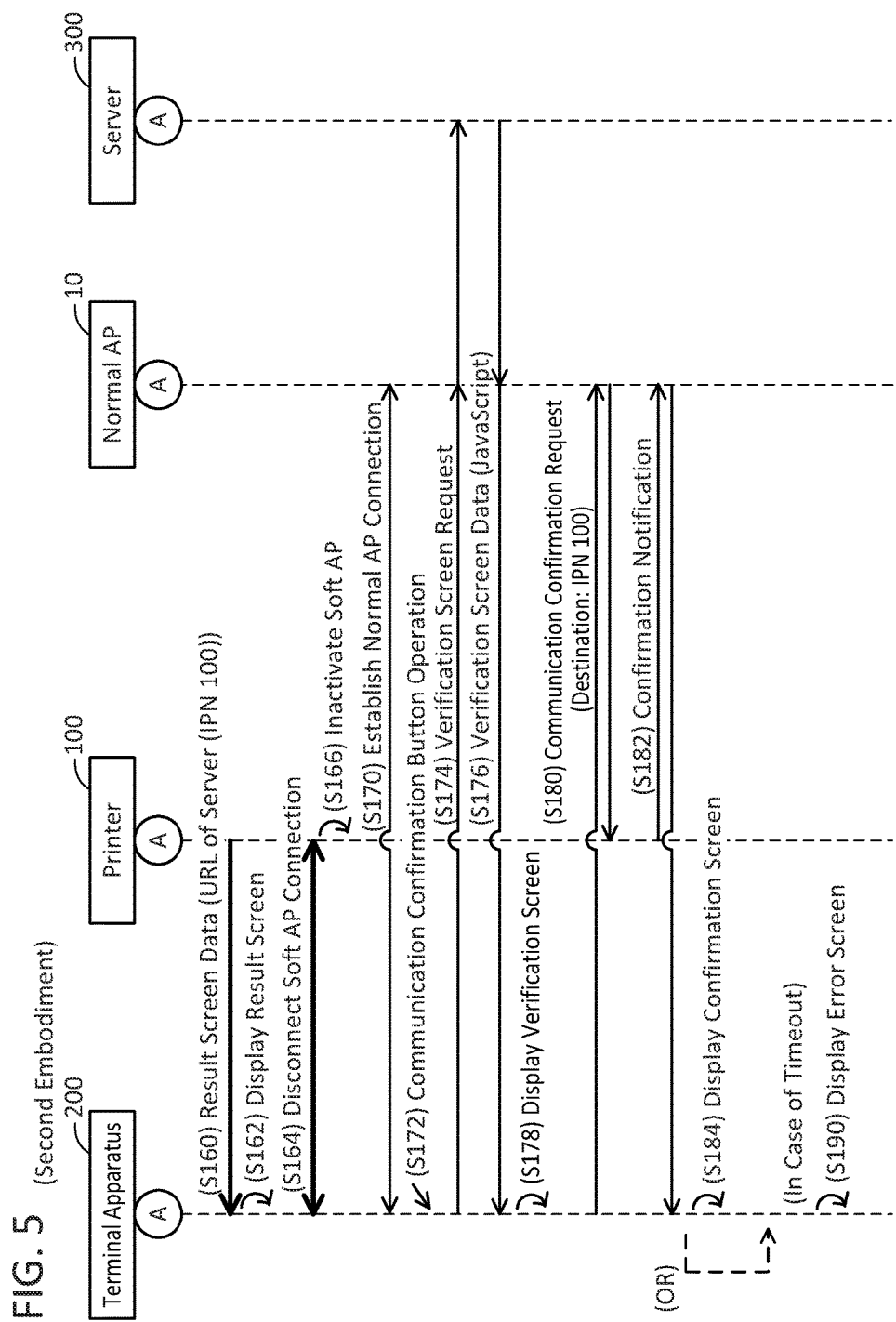

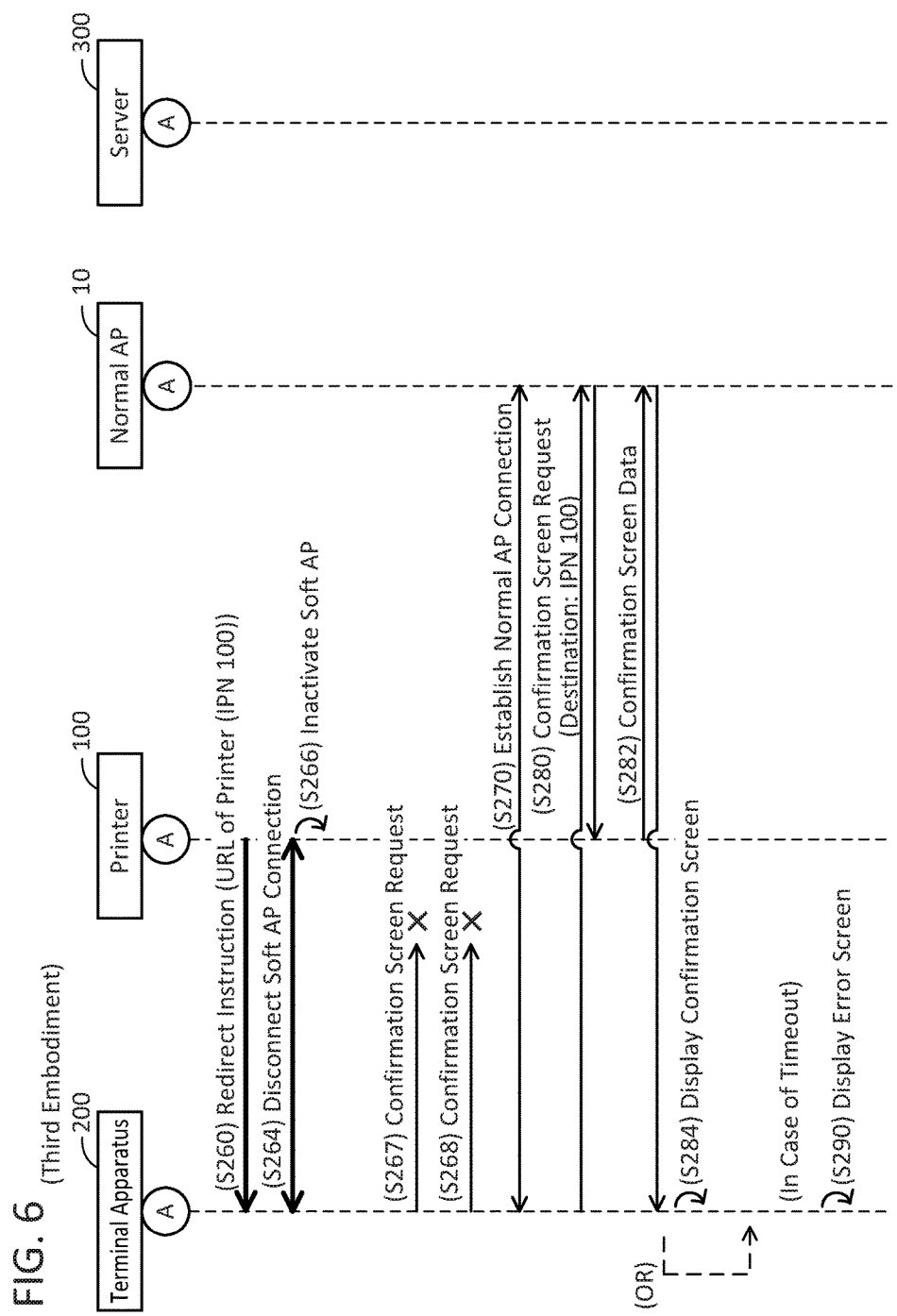

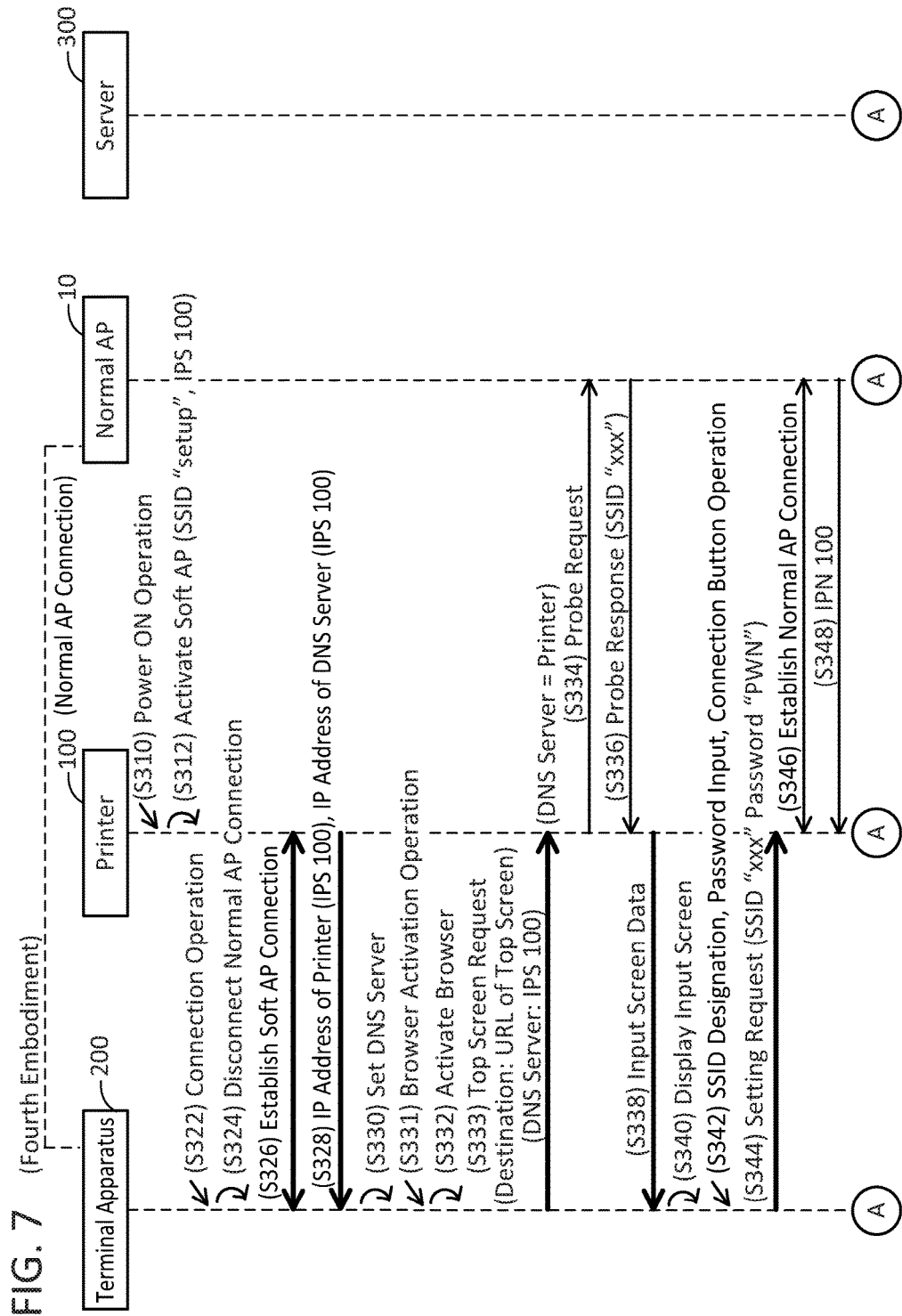

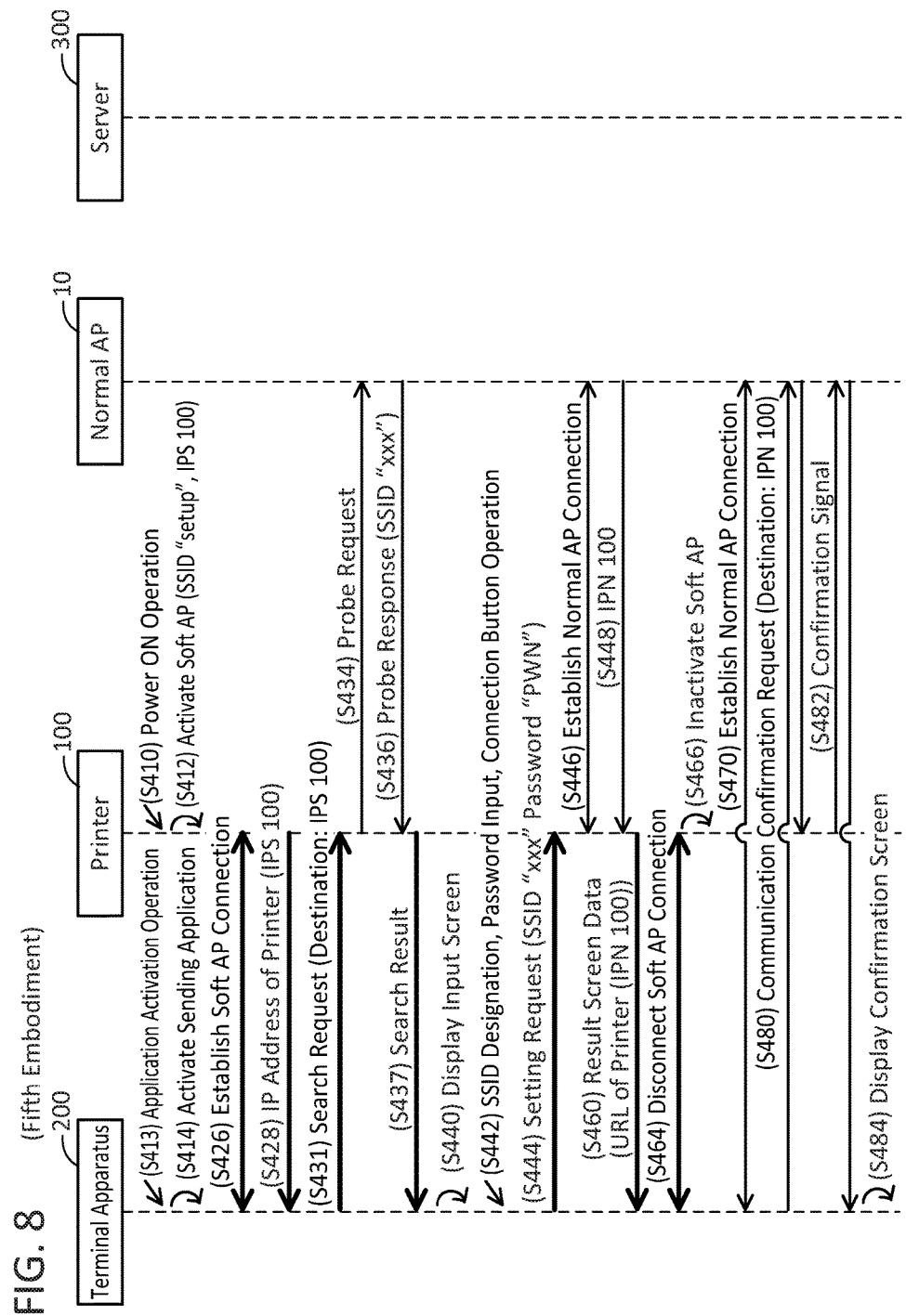

ered to the second printer by using ad hoc communication. Due to this, the second printer can connect to the access point by using the wireless setting. Further, the first printer determines an IP address of the second printer in the wireless network, and sends the IP address to the second printer using ad hoc communication. Due to this, the second printer can execute communication via the access point using the IP address. Thereafter, the first printer confirms whether or not the second printer has participated in the wireless network by sending a confirmation signal with the IP address of the second printer set as its destination.

SUMMARY

In the above technique, since the first printer determines the IP address of the second printer in the wireless network, the first printer can execute communication via the wireless network with the second printer by using the IP address. However, for example, when a different device from the first printer (e.g., DHCP (abbreviation of Dynamic Host Configuration Protocol) server different from the first printer) determines the IP address of the second printer, the first printer may not be able to execute the communication via the wireless network with the second printer because it may be difficult for the first printer to know the IP address of the second printer.

The present teachings provide a technique that allows a communication apparatus and an external apparatus to appropriately perform communication via an access point.

A communication apparatus may comprise: a processor; and a memory storing computer-readable instructions therein, the computer-readable instructions, when executed by the processor, causing the communication apparatus to perform: constructing a first wireless network to which the communication apparatus and an external apparatus belong and an access point does not belong; receiving, from the external apparatus by using the constructed first wireless network, a wireless setting used in a second wireless network, the second wireless network being a network to which the communication apparatus, the external apparatus, and the access point are to belong; establishing a wireless connection with the access point by using the received wireless setting; obtaining a first IP address of the communication apparatus in the second wireless network, the first IP address being not determined by the external apparatus; sending the obtained first IP address to the external apparatus by using the first wireless network after the wireless connection with the access point has been established; and receiving a signal from the external apparatus via the access point by using the second wireless network after the first IP address has been sent to the external apparatus, the signal being a signal of which the first IP address is designated as a destination.

A control method and computer-readable instructions for implementation of the communication apparatus described above, and a non-transitory computer-readable recording medium in which the computer-readable instructions are stored, are also novel and useful. Further, a communication system including the above communication apparatus and the external apparatus is also novel and useful.

BRIEF DESCRIPTION OF DRAWINGS

FIG. 5 illustrates a sequence diagram of a second embodiment;

FIG. 6 illustrates a sequence diagram of a third embodiment;

FIG. 7 illustrates a sequence diagram of a fourth embodiment; and

FIG. 8 illustrates a sequence diagram of a fifth embodiment.

EMBODIMENTS

Figure 1:
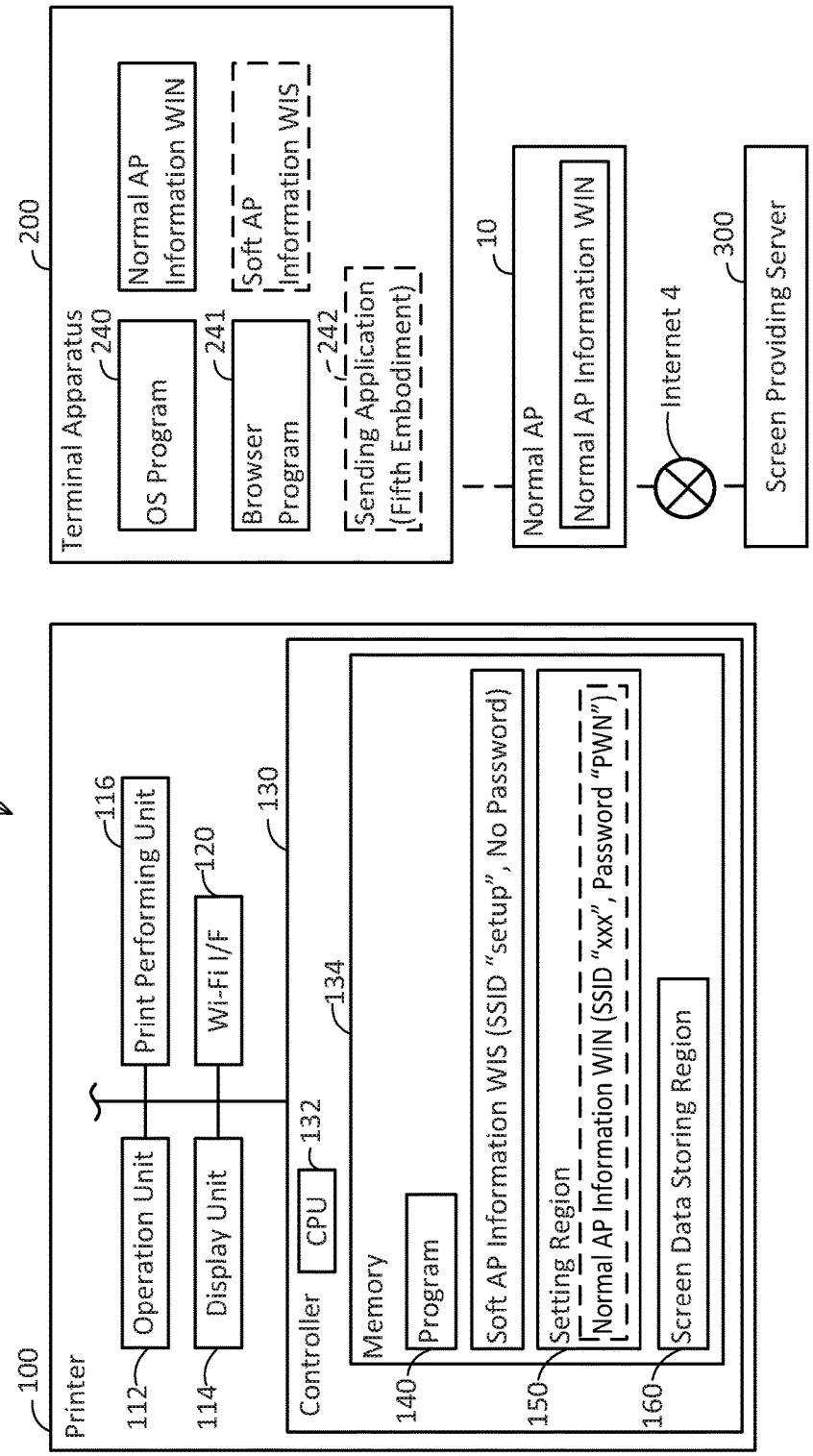
FIG. 1 illustrates a configuration of a communication system.

First Embodiment (Configuration of System; FIG. 1)

As shown in FIG. 1, a communication system 2 comprises a printer 100, a terminal apparatus 200, and a screen providing server 300. The printer 100 and the terminal apparatus 200 are capable of establishing wireless connection with a normal access point 10. Hereafter, the normal access point will be described as "normal AP (abbreviation of Access Point)". The normal AP 10 and the screen providing server 300 are connected to the Internet 4. When the printer 100 and the terminal apparatus 200 have established wireless connection with the normal AP 10, the printer 100 and the terminal apparatus 200 are capable of communicating with each other via the normal AP 10, and also capable of communicating with the screen providing server 300 via the normal AP 10.

(Configuration of Printer 100)

The printer 100 comprises an operation unit 112, a display unit 114, a print performing unit 116, a Wi-Fi interface 120, and a controller 130. Hereafter, the interface will be referred to as "I/F". The operation unit 112 includes a plurality of keys, and receives operations from a user. The display unit 114 is a display for displaying various types of information, and functions also as a so-called touch panel. That is, the display unit 114 also functions as an operation unit. Hereafter, at parts where the operation units of the printer 100 are described, they will be described as simply "operation unit" omitting reference numerals 112, 114. The print performing unit 116 comprises print mechanism such as ink jet method, laser method, etc.

The Wi-Fi I/F 120 is an I/F for performing wireless communication complying with a Wi-Fi scheme. The Wi-Fi scheme is a wireless communication scheme conforming to standards formulated by the Wi-Fi Alliance, and for example, is IEEE (abbreviation of the Institute of Electrical and Electronics Engineers, Inc.) 802.11 standards, and standards conforming thereto (e.g., 802.11a,11b,11g,11n). The Wi-Fi I/F 120 especially supports Soft AP (abbreviation of Software Access Point) function. The Wi-Fi I/F 120 is capable of performing concurrently wireless communication in accordance with the SoftAP function (i.e., wireless communication which is not via the normal AP 10) and wireless communication via the normal AP 10.

The controller 130 comprises a CPU 132 and a memory 134. The memory 134 is constituted of ROM, RAM or the like, and has a program 140 and SoftAP information WIS pre-stored before shipment of the printer 100. The CPU 132 performs various types of processing in accordance with the program 140.

The SoftAP information WIS is information referred to by the CPU 132 during a course of executing the program 140, and used in a wireless network (hereafter "SoftAPNW") formed by the printer 100 operating as a SoftAP. After the printer 100 starts to operate as the SoftAP (i.e., as parent station of the SoftAPNW), the printer 100 can establish wireless connection (hereafter "SoftAP connection") with a terminal apparatus (e.g., 200) using the information WIS and cause the terminal apparatus to participate in the SoftAPNW as a child station. The information WIS includes an SSID (abbreviation of Service Set Identifier) "setup", but does not include a password. The SSID is an identifier for identifying the SoftAPNW. Because the information WIS does not include a password, the SoftAPNW is a network where authentication and encryption using a password is not performed. It should be noted that the information WIS is pre-stored in the memory 134 since before the printer 100 was shipped in the present embodiment, but alternatively in a modification, the information WIS may be installed to the memory 134 from a server on the Internet after the printer 100 is shipped.

The memory 134 further comprises a setting region 150. The setting region 150 may store normal AP information WIN. The information WIN is information used in a wireless network formed by the normal AP 10 (hereafter "normal APNW"). The information WIN includes an SSID "xxx" and a password "PWN". This SSID is an identifier for identifying the normal APNW. This password is information used for authentication and encryption in the normal APNW. The printer 100 can establish wireless connection with the normal AP 10 (hereafter "normal AP connection") using the information WIN and participate as a child station in the normal APNW.

The memory 134 further includes a screen data storing region 160. The region 160 stores several screen data representing several screens (see 420, 430, 440 in FIG. 4) to be displayed on a display unit of a terminal apparatus (e.g., 200) when the printer 100 is to establish the normal AP connection.

(Configuration of Terminal Apparatus 200)

The terminal apparatus 200 may be a stationary type apparatus such as a desktop PC, or a mobile apparatus such as a notebook PC, a tablet PC, a smartphone or the like. The terminal apparatus 200 comprises a display unit, an operation unit, a Wi-Fi I/F, and a controller that are not shown. The controller includes a CPU and a memory.

The Wi-Fi I/F of the terminal apparatus 200 does not support the SoftAP function. That is, the terminal apparatus 200 does not operate as the SoftAP (i.e., parent station). In a modification, the I/F of the terminal apparatus 200 may support the SoftAP function.

The CPU of the terminal apparatus 200 performs several types of processing in accordance with an OS (abbreviation of Operation System) program 240 stored in the memory. The terminal apparatus 200 has established normal AP connection with the normal AP 10 and is participating as a child station in the normal APNW formed by the normal AP 10. The memory stores the normal AP information WIN for establishing the normal AP connection.

The memory further stores a browser program 241. The browser program 241 is a program for the CPU of the terminal apparatus 200 to use the normal APNW or the SoftAPNW (i.e., via the normal AP 10), receive screen data from the screen providing server 300 or the printer 100, and display a screen represented by the screen data on the display unit of the terminal apparatus 200.

The memory may further store the SoftAP information WIS. The terminal apparatus 200 can establish a SoftAP connection with the printer 100 operating as the SoftAP by using the SoftAP information WIS and participate as a child station in the SoftAPNW.

Further, FIG. 1 illustrates that the memory stores a sending application 242, but in first to fourth embodiments, the memory does not store the application 242. In a fifth embodiment to be described later, the memory stores the application 242.

(Configuration of Normal AP 10)

The normal AP 10 is a known AP called wireless AP, wireless LAN router, etc., and stores the normal AP information WIN. The normal AP 10 establishes normal AP connection with the terminal apparatus 200 in accordance with a so-called automatic wireless setting such as WPS (Wi-Fi Protected Setup) for example, or in accordance with a manual wireless setting.

(Configuration of Screen Providing Server 300)

The screen providing server 300 (hereafter, simply "server 300") is disposed on the Internet 4 by a vendor of the printer 100. The server 300 stores setting screen data representing a setting screen (see 410 of FIG. 4) displayed on the display unit of a terminal apparatus (e.g., 200) when the printer 100 is to execute various processes for establishing the normal AP connection.

Figure 2:
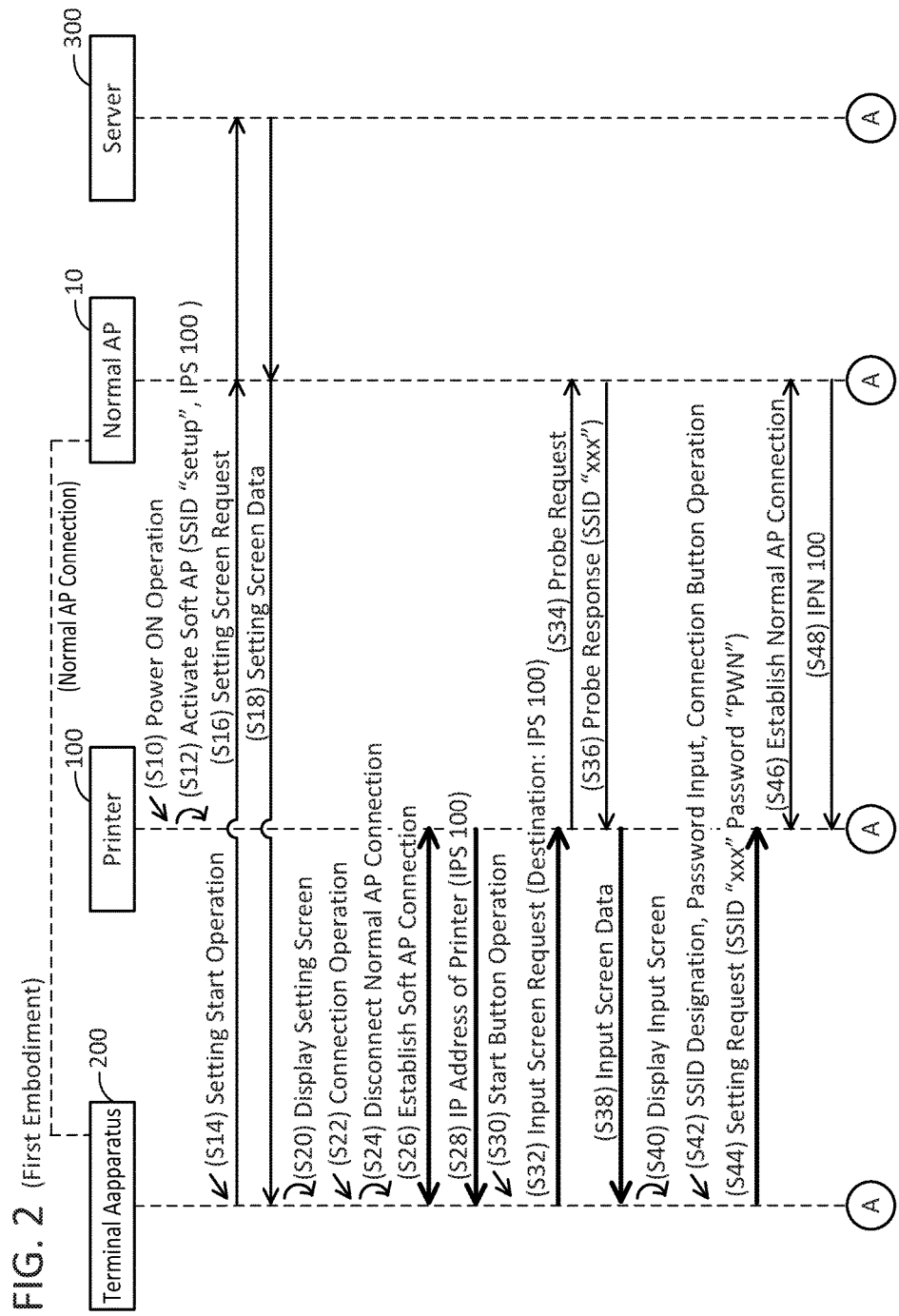
FIG. 2 illustrates a sequence diagram showing how a printer establishes connection with a normal AP.
Figure 3:
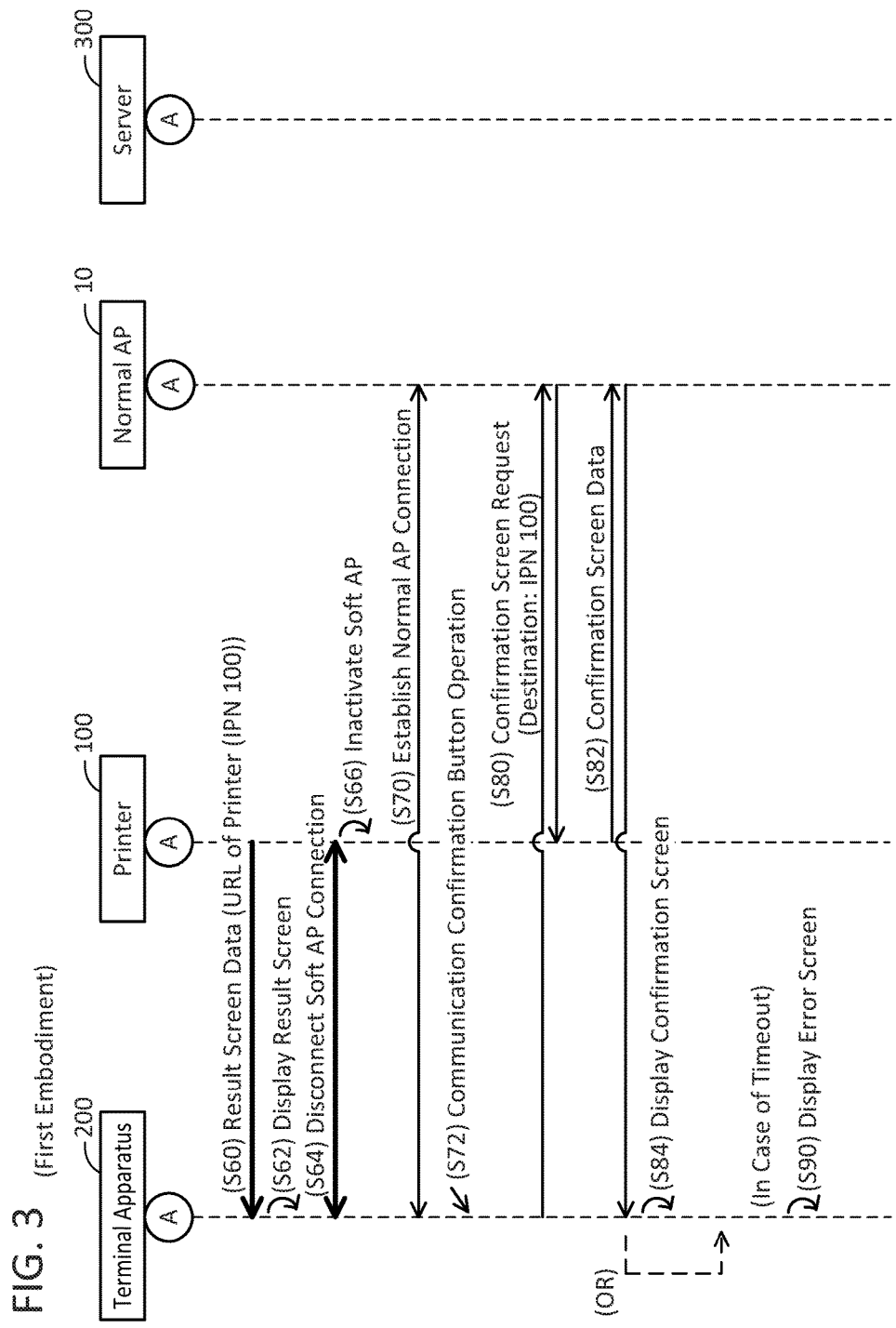
FIG. 3 illustrates a sequence diagram that is a continuation of FIG. 2.

(Processes for Printer 100 to Establish Normal AP Connection; FIGS. 2, 3)

Subsequently, with reference to FIGS. 2 and 3, processes for the printer 100 to establish the normal AP connection will be described. In examples of FIGS. 2 and 3, a situation is assumed where the terminal apparatus 200 has established the normal AP connection and a user causes the printer 100, which is newly installed, to establish normal AP connection. In the present embodiment, the terminal apparatus 200 executes respective processes of FIGS. 2 and 3 in accordance with the browser program 241. Due to this, the terminal apparatus 200 can perform the respective processes of FIGS. 2 and 3 even when the terminal apparatus 200 does not store an application program dedicated for sending the normal AP information WIN to the printer 100.

In S10, when the user performs a power-ON operation on the operation unit of the printer 100, power of the printer 100 is turned on. At this occasion, in S12, the CPU 132 of the printer 100 automatically activates the SoftAP to form a SoftAPNW, and starts to operate as a parent station of the SoftAPNW (i.e., as SoftAP). The user does not have to perform an operation for activating the SoftAP after performing the power-ON operation, meaning an improved user convenience.

In S14, the user performs a setting start operation on the terminal apparatus 200. The setting start operation includes an operation for activating the browser program 241 and an operation for inputting a URL (abbreviation of Uniform Resource Locator) of the server 300. In a modification, the setting start operation may be an operation for having the terminal apparatus 200 read an information code (e.g., bar code) shipped with the printer 100. The information code is indicative of the URL of the server 300.

Figure 4:
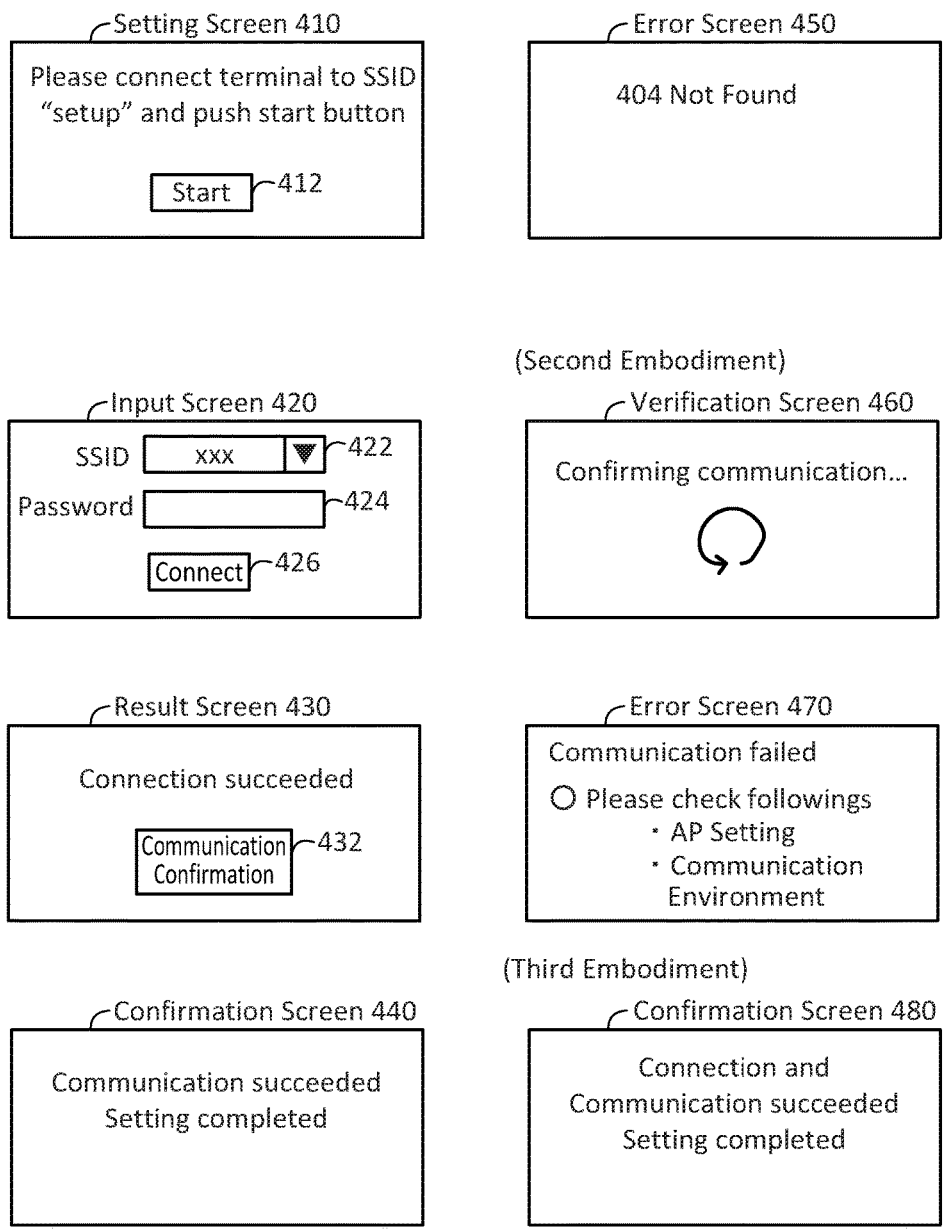
FIG. 4 illustrates examples of screens displayed by a terminal apparatus.

In S16, the terminal apparatus 200 sends a setting screen request using the normal APNW to the server 300 via the normal AP 10. The request is a signal for requesting sending of setting screen data representing the setting screen 410 of FIG. 4. In S18, the terminal apparatus 200 receives the setting screen data from the server 300 via the normal AP 10, and in S20 displays the setting screen 410 (FIG. 4) represented by the setting screen data. As shown in FIG. 4, the setting screen 410 includes a predetermined message and a start button 412. The predetermined message is a message for encouraging the user to operate the button 412 after having the terminal apparatus 200 execute the establishment of wireless connection (i.e., SoftAP connection) with the printer 100 (i.e., AP of which SSID is "setup") operating as the SoftAP.

In S22, the user performs a connection operation on the terminal apparatus 200. The connection operation is an operation for causing the terminal apparatus 200 to execute the establishment of wireless connection with the printer 100 operating as the SoftAP, and specifically includes an operation for changing a connection destination (i.e., AP) of the wireless connection of the terminal apparatus 200 from the normal AP 10 (i.e., AP of which SSID is "xxx") to the printer 100 (i.e., AP of which SSID is "setup"). In S24, the terminal apparatus 200 disconnects the normal AP connection with the normal AP 10.

In S26, the CPU 132 of the printer 100 establishes SoftAP connection with the terminal apparatus 200 using the SoftAP information WIS. Specifically, in S26, the CPU 132 firstly receives a connection request for requesting establishment of the SoftAP connection from the terminal apparatus 200. Subsequently the CPU 132 executes communication of respective signals (e.g., Authentication signal, Association signal, 4-way handshake, etc.) with the terminal apparatus 200. During the course of communicating the respective signals, the CPU 132 receives an SSID from the terminal apparatus 200 and determines whether it matches the SSID "setup". In the present embodiment, since no password is set in the SoftAPNW, the CPU 132 receives no password from the terminal apparatus 200. In a case where the CPU 132 determines that the received SSID matches the SSID included in the SoftAP information WIS, i.e., authentication of the terminal apparatus 200 succeeds, the CPU 132 establishes the SoftAP connection with the terminal apparatus 200 and causes the terminal apparatus 200 to participate as a child station in the SoftAPNW. Due to this, the SoftAPNW which is a SoftAPNW to which the printer 100 and the terminal apparatus 200 belong and the normal AP 10 does not belong, can be appropriately established. When the SoftAP connection is established in S26, in subsequent S28, the CPU 132 notifies the terminal apparatus 200 of an IPS100, which is an IP address of the printer 100, in the SoftAPNW.

In S30, the user operates the start button 412 in the setting screen 410 (FIG. 4) being displayed on the terminal apparatus 200. Due to this, in S32, the terminal apparatus 200 sends, using the SoftAPNW, an input screen request to the printer 100.

In S32, the CPU 132 of the printer 100 receives, using the SoftAPNW, the input screen request from the terminal apparatus 200. In the input screen request, the IPS100, which is the IP address of the printer 100 in the SoftAPNW, is designated as a destination. The input screen request is a signal for requesting sending of input screen data representing an input screen 420 (see FIG. 4). In S34, the CPU 132 broadcasts a probe request which is a signal for searching for apparatus(es) being a connection target. In S36, the CPU 132 receives a probe response that is sent in response to the probe request from the normal AP 10. This response includes the SSID "xxx" in the normal AP information WIN. Although not illustrated, in S36, the CPU 132 may receive the probe response including an SSID from another normal AP existing in surroundings of the printer 100. In S38, the CPU 132 sends, using the SoftAPNW, the input screen data to the terminal apparatus 200. The input screen data includes one or more SSIDs received in S36. However, if the CPU 132 did not receive even a single probe response in the above S36, the input screen data sent in S38 does not include an SSID.

In S40, the terminal apparatus 200 displays the input screen 420 (see FIG. 4) represented by the input screen data. As shown in FIG. 4, the input screen 420 includes an SSID designation column 422, a password input column 424, and a connection button 426. The column 422 is a column for designating an SSID (e.g., "xxx") indicating an AP to which the printer 100 is to connect. In the case where one or more SSIDs were received in S36, when the column 422 is operated, a list of the one or more SSIDs is displayed. The user can designate one SSID from the list. It should be noted that, if no probe response was received in S36, the column 422 is blank, but the user can manually input an SSID. The column 424 is a column for inputting a password used in a wireless network indicated by the SSID designated in the column 422. The button 426 is a button for requesting the printer 100 to establish the normal AP connection. In S42, the user designates the SSID "xxx" in the column 422, inputs the password "PWN" in the column 424, and thereafter operates the button 426. Due to this, the terminal apparatus 200 sends, using the SoftAPNW, a setting request to the printer 100. This setting request is a signal for requesting the printer 100 to establish the normal AP connection.

In S44, the CPU 132 of the printer 100 receives, using the SoftAPNW, the setting request from the terminal apparatus 200. The setting request includes the SSID "xxx" designated in the column 422 and the password "PWN" inputted in the column 424. That is, the printer 100 receives the SSID and the password inputted in the input screen 420 displayed on the terminal apparatus 200.

In S46, the CPU 132 establishes the normal AP connection with the normal AP 10 using the normal AP information WIN (i.e., SSID "xxx" and password "PWN") included in the setting request. Specifically, the CPU 132 performs communication of respective signals (e.g., Authentication signal, Association signal, 4-way handshake, etc.) with the normal AP 10. During the course of communicating the respective signals, the CPU 132 sends the normal AP information WIN included in the setting request to the normal AP 10 and cause the normal AP 10 to authenticate the normal AP information WIN, i.e., to authenticate the printer 100. Due to this, the CPU 132 establishes the normal AP connection with the normal AP 10 and causes the printer 100 to participate as a child station in the normal APNW. In S48, the CPU 132 receives, using the normal APNW, an IPN100 from the normal AP 10. The IPN100 is an IP address of the printer 100 in the normal APNW, and an IP address determined by the normal AP 10 functioning as a DHCP (abbreviation of Dynamic Host Configuration Protocol) server.

Subsequently, in S60 of FIG. 3, the CPU 132 sends, using the SoftAPNW, result screen data to the terminal apparatus 200. The result screen data is data representing a result screen 430 (see FIG. 4) and including a URL for sending, using the normal APNW, a confirmation screen request (see S80 to be described later) to the printer 100. The URL of the printer 100 (specifically, host portion in the URL) includes the IPN100.

In S62, the terminal apparatus 200 displays the result screen 430 (see FIG. 4) represented by the result screen data. As shown in FIG. 4, the result screen 430 includes a message notifying that the normal AP connection has successfully been established, and a communication confirmation button 432. By seeing the result screen 430, the user can know that the printer 100 has established the normal AP connection. The button 432 is a button for causing the printer 100 and the terminal apparatus 200 to attempt communication using the normal APNW therebetween. The button 432 is associated with the URL of the printer 100 included in the result screen data. In other words, the button 432 is a link to the URL (i.e., URL including the IPN100) of the printer 100. In the present embodiment, the printer 100 can realize, by sending the result screen data to the terminal apparatus 200, both of sending the IPN100 to the terminal apparatus 200 and notifying the user of success of the normal AP connection establishment in the printer 100.

In S64, the CPU 132 of the printer 100 disconnects the SoftAP connection with the terminal apparatus 200. Specifically, the CPU 132 disconnects the SoftAP connection by sending, using the SoftAPNW, a disconnection instruction to the terminal apparatus 200. In S66, the CPU 132 inactivates the SoftAP. Due to this, the SoftAPNW disappears. In a modification, the CPU 132 may cause the SoftAPNW to disappear by inactivating the SoftAPNW without sending the disconnection instruction to the terminal apparatus 200.

In S70, the terminal apparatus 200 re-establishes the normal AP connection with the normal AP 10 that was disconnected in S24 of FIG. 2. Specifically, the terminal apparatus 200 establishes the normal AP connection with the normal AP 10 using the normal AP information WIN in the memory. How to establish the normal AP connection is the same as S46 of FIG. 2. Thereafter, in S72, the user operates the communication confirmation button 432 in the result screen 430 (FIG. 4) being displayed on the terminal apparatus 200. In this case, in S80, the terminal apparatus 200 sends, using the normal APNW, the confirmation screen request to the printer 100. More specifically, the terminal apparatus 200 accesses a URL associated with the button 432 (i.e., a region where confirmation screen data in the memory 134 of the printer 100 is stored). As mentioned above, the host portion in the URL includes the IPN100. Therefore, when the button 432 is operated, even without another special operation being performed, the terminal apparatus 200 can send the confirmation screen request in which the IPN100 (i.e., printer 100) is designated as a destination. This request is a signal for requesting sending of confirmation screen data representing a confirmation screen 440.

In S80, the CPU 132 of the printer 100 receives, using the normal APNW, the confirmation screen request from the terminal apparatus 200 via the normal AP 10. In this case, in S82, the CPU 132 sends, using the normal APNW, the confirmation screen data to the terminal apparatus 200 via the normal AP 10.

In S84, the terminal apparatus 200 displays the confirmation screen 440 (FIG. 4) represented by the confirmation screen data. As shown in FIG. 4, the confirmation screen 440 includes a message indicating that the communication using the normal APNW between the printer 100 and the terminal apparatus 200 succeeded, and also the setting has completed.

In the meantime, there is a possibility that, after the terminal apparatus 200 has sent the confirmation screen request of S80 to the printer 100, a predetermined timeout period may elapse without receiving the confirmation screen data of S82 from the printer 100. For example, in cases where the printer 100 participates in another normal APNW formed by a different AP from the normal AP 10, or the normal AP 10 is in a state unable to relay wireless communication, etc., the confirmation screen request sent by the terminal apparatus 200 does not reach the printer 100, as a result of which the confirmation screen data cannot be received. In this case, in S90, the terminal apparatus 200 displays an error screen 450 (see FIG. 4). The error screen 450 is not a screen represented by screen data received from an exterior (e.g., the printer 100, server 300) but is a screen represented by screen data incorporated in the browser program 241. As shown in FIG. 4, the error screen 450 includes a predetermined error message "404 Not Found". Due to this, the user can know that communication using the normal APNW cannot be executed between the printer 100 and the terminal apparatus 200.

(Advantages of Present Embodiment)

As mentioned above, in S60 of FIG. 3, the printer 100 sends, using the SoftAPNW, the result screen data representing the result screen 430 to the terminal apparatus 200. The result screen data includes the IPN100 (i.e., IP address of the printer 100 in the normal APNW) being the IP address assigned to the printer 100 by the normal AP 10. Due to this, the printer 100 can appropriately receive from the terminal apparatus 200, via the normal AP 10, the confirmation screen data in which the IPN100 is designated as a destination. Therefore, the printer 100 and the terminal apparatus 200 can perform appropriately communication via the normal AP 10.

(Correspondence Relationship)

The printer 10 and the terminal apparatus 200 are examples of "a communication apparatus" and "an external apparatus", respectively. The SoftAPNW and the normal APNW are examples of "a first wireless network" and "a second wireless network", respectively. The normal AP information WIN is an example of "a wireless setting". The IPN100 is an example of "a first IP address". The state where the printer 100 operates as the SoftAP is an example of "a parent state". The result screen data (S60 of FIG. 3) is an example of "first screen data". The URL of the printer 100 included in the result screen data is an example of "a specific URL". The IPS100 is an example of the "second IP address". The input screen request (S32 of FIG. 2) is an example of "a first screen request". The input screen data (S38) is an example of "second screen data". The input screen 420 is an example of "a designation screen". The URL of the printer 100 in S60 of FIG. 3 and the host portion in that URL are examples of "a specific URL" and "a predetermined portion", respectively.

Second Embodiment

As shown in FIG. 5, the present embodiment differs from the first embodiment in that the process for the printer 100 to establish the normal AP connection is partially different from that of the first embodiment.

Also in the present embodiment, same processes as the respective processes of S10 to S48 of FIG. 2 are executed. Then, in the present embodiment, after the process at S48 of FIG. 2, respective processes of S160 and onward of FIG. 5 will be executed. Processes of S160 and S162 are mostly the same as those of S60 and S62 of FIG. 3. However, in the present embodiment, result screen data sent in S160 differs from the first embodiment in that it includes a URL of the server 300. The URL of the server 300 (specifically, a query portion in the URL) includes the IPN100. Therefore, the terminal apparatus 200 can receive the IPN100 being the IP address of the printer 100 in the normal APNW by obtaining the result screen data of S160. Further, the communication confirmation button 432 in the result screen 430 displayed in S162 is associated with the URL of the server 300 that is included in the result screen data (i.e., the button 432 is a link to the URL of the server 300 (i.e., URL including the IPN100)). Respective processes S164 to S172 are the same as the respective processes of S64 to S72 of FIG. 3.

In the present embodiment, when the communication confirmation button 432 is operated in S172, in S174 the terminal apparatus 200 sends, using the normal APNW, a verification screen request to the server 300 via the normal AP 10. The verification screen request is a signal for requesting the server 300 to send verification screen data representing a verification screen 460 of FIG. 4. Therefore, when the button 432 is operated by the user, the terminal apparatus 200 accesses the URL of the server 300 (i.e., a region in the server 300 where the verification screen data is stored) associated with the button 432. Therefore, by the button 432 being operated, the terminal apparatus 200 can send the verification screen request to the server 300 without requiring another special operation.

When receiving the verification screen request from the terminal apparatus 200, the server 300 generates the verification screen data including JavaScript (registered trademark) for causing the terminal apparatus 200 to execute respective processes of S180 and onward to be described later. Then, in S176, the server 300 sends, using the normal APNW, the generated verification screen data to the terminal apparatus 200 via the normal AP 10.

The terminal apparatus 200 receives, using the normal APNW, the verification screen data (see S176) from the server 300 via the normal AP 10. In S178, the terminal apparatus 200 displays the verification screen 460 of FIG. 4 represented by the verification screen data. As shown in FIG. 4, the verification screen 460 includes a message notifying that communication using the normal APNW with the printer 100 is being attempted.

In S180, the terminal apparatus 200 sends, using the JavaScript received in S176, a communication confirmation request with the IPN100 (i.e., IP address of the printer 100 in the normal APNW) included in the result screen data (S160) being a destination. The communication confirmation request is a signal for requesting the printer 100 for confirmation that the printer 100 is able to perform communication via the normal AP 10.

When receiving the communication confirmation request in S180, the CPU 132 of the printer 100 sends, using the normal APNW, a confirmation notification to the terminal apparatus 200 via the normal AP 10 in S182. The confirmation notification is a signal for notifying that the printer 100 is able to perform the communication via the normal AP 10.

In S184, the terminal apparatus 200 displays the confirmation screen 440 (FIG. 4) using the JavaScript received in S176.

Contrary to this, in a case where a predetermined timeout period elapses without receiving the confirmation notification of S182 from the printer 100 after the terminal apparatus 200 had sent the communication confirmation request of S180 to the printer 100, the terminal apparatus 200 displays an error screen 470 of FIG. 4 in S190 using the JavaScript received in S176. As shown in FIG. 4, the error screen 470 includes a message notifying that the communication with the printer 100 via the normal AP 10 has failed, and a message indicating a solution for the problem. Therefore, according to the present embodiment, it is possible to deliver more meaningful information at the error screen 470 to the user, as compared to the configuration of the first embodiment in which the error screen 450 including only the message "404 Not Found" is displayed. The URL of the server 300 in S160 and the query portion in that URL are examples of "a specific URL" and "a predetermined portion", respectively.

Third Embodiment

As shown in FIG. 6, the present embodiment also differs from the first embodiment in that the process for the printer 100 to establish the normal AP connection is partially different from that of the first embodiment.

In the present embodiment also, each device performs the same processes as the respective processes of S10 to S48 in FIG. 2. Then, in the present embodiment, after the process in S48 of FIG. 2, respective processes of S260 and onward in FIG. 6 are executed. In S260, the CPU 132 of the printer 100 sends, using the SoftAPNW, a redirect instruction including the URL of the printer 100 to the terminal apparatus 200. The redirect instruction is a signal for instructing the terminal apparatus 200 to access the URL of the printer 100. The URL of the printer 100 (specifically, a host portion in the URL) includes the IPN100. Respective processes of subsequent S264 and S266 are the same as the respective processes of S64 and S66 in FIG. 3.

In S267 and S268, the terminal apparatus 200 attempts to send a confirmation screen request in which the IPN100 is designated as a destination (i.e., attempts to access the URL of the printer 100 included in the redirection instruction) in accordance with the redirect instruction received in S260. However, since at S267 and S268 the terminal apparatus 200 has not yet re-established the normal AP connection with the normal AP 10, the CPU 132 of the printer 100 cannot receive the confirmation screen request via the normal AP 10.

Thereafter, in S270, the terminal apparatus 200 re-establishes the normal AP connection with the normal AP 10 that was disconnected in S24 of FIG. 2. Then, in S280, the terminal apparatus 200 attempts to send the confirmation screen request in which the IPN100 is set as a destination. Since at S280 the terminal apparatus 200 has already established the normal AP connection with the normal AP 10, the CPU 132 of the printer 100 can receive the confirmation screen request via the normal AP 10. As such, in the present embodiment, even without a button operation by the user, the terminal apparatus 200 can send the confirmation screen request automatically to the printer 100 in accordance with the redirect instruction. Operation burden on the user can be reduced.

Respective processes of S282, S284, and S290 are the same as the respective processes of S82, S84, and S90 in FIG. 3, thereby detailed descriptions of S282, S284, and S290 will be omitted.

Fourth Embodiment

As shown in FIG. 7, the present embodiment differs from the first embodiment in that the process for the printer 100 to establish the normal AP connection is partially different from that of the first embodiment.

In the present embodiment also, when power of the printer 100 is turned on in S310, in subsequent S312, the CPU 132 of the printer 100 activates the SoftAP.

In the present embodiment, in S322 the user performs the same connection operation as S22 in FIG. 2 on the terminal apparatus 200. In the present embodiment, the user performs the connection operation without performing the setting start operation (see S14 in FIG. 2) on the terminal apparatus 200. That is, in the present embodiment, at S322 the browser program 241 has not yet been activated. Respective processes in subsequent S324 and S326 are also the same as S24 and S26 in FIG. 2.

In the present embodiment, in S328 the CPU 132 of the printer 100 sends an IP address of a DNS (abbreviation of Domain Name System) server in the SoftAPNW as well as the IPS100 being the IP address of the printer 100 in the SoftAPNW to the terminal apparatus 200. The IP address of the DNS server that is sent in S328 is the IPS100 being the IP address of the printer 100 in the SoftAPNW.

In S330, the terminal apparatus 200 sets the DNS server. Specifically, the terminal apparatus 200 sets the IPS100 (see S328) that was received from the printer 100 as the IP address of the DNS server in the SoftAPNW.

In S331, the user performs a predetermined browser activation operation on the terminal apparatus 200. The browser activation operation is an operation for activating the browser program 241. In subsequent S332, the terminal apparatus 200 activates the browser program 241.

In S333, the CPU 132 of the printer 100 being the SoftAP receives, using the SoftAPNW, a top screen request from the terminal apparatus 200. The top screen request is a signal for accessing a predetermined top screen (e.g., a screen of a predetermined web portal) that is set in the browser program 241 of the terminal apparatus 200. In the top screen request, a URL of the top screen is designated as a destination. Further, the IPS100 has been designated as the IP address of the DNS server for when the terminal apparatus 200 sends the top screen request.

Details of the process performed in S333 will be described. Firstly, the terminal apparatus 200 sends a name resolution request being a signal for requesting name resolution of a domain name included in the URL of the top screen (hereafter "specific domain name"), with the IPS100 being the IP address of the DNS server in the SoftAPNW (i.e., the printer 100) as a destination. This name resolution request includes the specific domain name. When receiving the name resolution request from the terminal apparatus 200, the CPU 132 of the printer 100 sends, as a response to the request, the IPS100 instead of an IP address corresponding to the specific domain name included in the request (i.e., original IP address corresponding to a supply source of the top screen) to the terminal apparatus 200. Then, the terminal apparatus 200 sends the top screen request in response to the IPS100 (i.e., printer 100). Due to this, the CPU 132 of the printer 100 receives the top screen request from the terminal apparatus 200.

When receiving the top screen request in S333, in subsequent S334 the CPU 132 broadcasts a probe request, and in S336 receives a probe response sent from the normal AP 10. Respective processes of S334 and S336 are the same as S34 and S36 in FIG. 2. Subsequently, in S338, the CPU 132 sends, similarly to S38 in FIG. 2, using the SoftAPNW, the input screen data to the terminal apparatus 200. That is, as shown in the above S333 to S338, in the present embodiment, no matter which URL is set as the destination in the received top screen request (see S333), the CPU 132 sends the input screen data (see S338) to the terminal apparatus 200. That is, in the present embodiment, the CPU 132 can be rephrased as having a so-called Captive Portal function. Therefore, in the present embodiment, even if an operation dedicated for displaying the input screen 420 is not performed, the terminal apparatus 200 can display the input screen 420 (see FIG. 4).

Respective processes of subsequent S340 to S348 are the same as S40 to S48 in FIG. 2, due to which detailed descriptions of S340 to S348 will be omitted. Further, after the process of S348, each device performs, similarly to the first embodiment, the processes of S60 to S90 in FIG. 3.

The IPS100 in the present embodiment is an example of the "second IP address". The top screen request is an example of "a second screen request". The input screen data is an example of the "second screen data".

Fifth Embodiment

In the present embodiment, the memory of the terminal apparatus 200 stores the sending application 242. The sending application 242 is an application program for sending the normal AP information WIN of the normal AP 10 to the printer 100. The sending application 242 is installed to the terminal apparatus 200 from a server (not shown) on the Internet that is provided by the vendor of the printer 100. In a modification, the sending application 242 may be installed to the terminal apparatus 200 from a medium shipped together with the printer 100. In the present embodiment, the terminal apparatus 200 can perform respective processes in accordance with the sending application 242. Therefore, as shown in FIG. 8, the present embodiment differs from the first embodiment in that the process for the printer 100 to establish the normal AP connection is partially different from that of the first embodiment.

Also in the present embodiment, as shown in FIG. 8, after power of the printer 100 is turned on in S410, in subsequent S412, the CPU 132 of the printer 100 activates the SoftAP.

In the present embodiment, in S413, the user performs a predetermined application activation operation on the terminal apparatus 200. The application activation operation is an operation for activating the sending application 242. In subsequent S414, the terminal apparatus 200 activates the sending application 242.

In S426, the CPU 132 of the printer 100 establishes the SoftAP connection with the terminal apparatus 200 using the SoftAP information WIS via the Wi-Fi I/F 120. At this occasion, the terminal apparatus 200 performs respective processes for establishing the SoftAP connection with the printer 100 in accordance with the sending application 242. Therefore, in the present embodiment, even if the user does not input the connection operation on the terminal apparatus 200, the SoftAP connection can be established between the printer 100 and the terminal apparatus 200. A process in subsequent S428 is the same as S28 in FIG. 2.

In subsequent S431, the CPU 132 receives, using the SoftAPNW, a search request from the terminal apparatus 200. The search request is a signal for requesting the printer 100 for notification of a search result of SSID(s) of AP(s) existing in surroundings of the printer 100. In the present embodiment, a process corresponding to S30 of FIG. 2 is not performed. Respective processes of subsequent S434 and S436 are the same as S34 and S36 of FIG. 2. In S437, the CPU 132 sends, using the SoftAPNW, the search result to the terminal apparatus 200. The search result includes one or more SSIDs that were received in S436. However, if the CPU 132 did not receive even a single probe response in the above S436, the search result sent in S437 does not include an SSID.

In S440, the terminal apparatus 200 displays the input screen 420 (see FIG. 4) in accordance with the sending application 242.

Respective processes of subsequent S442 to S460 are the same as S44 to S48 in FIG. 2 and S60 in FIG. 3, due to which detailed descriptions of S442 to S460 will be omitted. It should be noted however that, the present embodiment differs from the first embodiment in that in the present embodiment the terminal apparatus 200 does not display the result screen (see S430 of FIG. 4) even if the result screen data (see S460) is received from the printer 100.

Respective processes of subsequent S464, S466, and S470 are the same as S64, S66, and S70 in FIG. 3, due to which detailed descriptions of S464, S466, and S470 will be omitted.

In S480, the terminal apparatus 200 sends a communication confirmation request with the IPN100 included in the result screen data (S460) being a destination in accordance with the sending application 242. In the present embodiment, the terminal apparatus 200 sends automatically the communication confirmation request in S480 in accordance with the sending application 242 even if the communication confirmation button operation (see S72 in FIG. 3) is not performed after the normal AP connection with the normal AP 10 has been established (see S470).

The CPU 132 of the printer 100 sends, when receiving the communication confirmation request in S480, a confirmation notification to the terminal apparatus 200 using the normal APNW via the normal AP 10 in S482.

In S484, the terminal apparatus 200 displays the confirmation screen 440 (FIG. 4) in accordance with the sending application 242.

Further, although not illustrated, in a case where a predetermined timeout period elapses without receiving the confirmation notification of S82 from the printer 100 after the terminal apparatus 200 had sent the communication confirmation request to the printer 100, the terminal apparatus 200 displays a predetermined error screen in accordance with the sending application 242.

In the present embodiment, the terminal apparatus 200 performs the respective processes in accordance with the sending application 242. Therefore, the terminal apparatus 200 does not display the setting screen 410, the result screen 430, etc. As a result, as compared to the configuration of the first embodiment where the terminal apparatus 200 performs the respective processes in accordance with the browser program 241, a number of operations to be inputted by the user can be made less.

Specific examples of the present disclosure have been described in detail, however, these are mere exemplary indications and thus do not limit the scope of the claims. The art described in the claims include modifications and variations of the specific examples presented above. Some of the modifications for the above embodiments will hereinafter be listed.

(Modification 1)

In the above respective embodiments, the CPU 132 causes the printer 100 to operate as the SoftAP (S12 of FIG. 2, S312 of FIG. 7, and S412 of FIG. 8), establishes the SoftAP connection with the terminal apparatus 200 (S26 of FIG. 2, S326 of FIG. 7, and S426 of FIG. 8), and receives the normal AP information WIN from the terminal apparatus 200 via the SoftAPNW (S44 of FIG. 2, S344 of FIG. 7, and S444 of FIG. 8). The wireless network for receiving the normal AP information WIN from the terminal apparatus 200 may not be limited to the SoftAPNW, but simply needs to be any wireless network which does not include a normal AP. Therefore, for example, the CPU 132 may establish wireless connection in accordance with WFD (Wi-Fi Direct) scheme with the terminal apparatus 200, and receive the normal AP information WIN from the terminal apparatus 200 using a wireless network complying with the WFD scheme. In this modification, the Wi-Fi I/F 120 simply needs to support the WFD scheme. Details of the WFD scheme is described in "Wi-Fi Peer-to-Peer (P2P) Technical Specification Version1.1" formulated by the Wi-Fi Alliance. Further, the details of the WFD scheme are disclosed in US Patent Application Publication No. 2013/0260683, which is hereby incorporated by reference. In addition, the CPU 132 may establish ad-hoc connection for ad-hoc communication with the terminal apparatus 200 and receive the normal AP information WIN from the terminal apparatus 200 using the ad-hoc communication link. In still another example, the CPU 132 may establish Bluetooth (registered trademark) connection with the terminal apparatus 200 and receive the normal AP information WIN from the terminal apparatus 200 using the Bluetooth communication link. The wireless network complying with the WFD scheme, the ad-hoc communication link, and the Bluetooth link in these modification examples are respectively examples of the "first wireless network". Further, in the respective examples in this modification, the CPU 132 does not need to cause the printer 100 to operate as the parent station in a wireless network. That is, in the present modification, "changing an operation state of the communication apparatus from a specific state . . . to a parent state . . . " and "establishing a wireless connection with the external apparatus after the operation state of the communication apparatus has been changed to the parent state" may be omitted.

(Modification 2)

In the respective above embodiments, after the SoftAP connection between the printer 100 and the terminal apparatus 200 has been disconnected (S64 of FIG. 3, S164 of FIG. 5, S264 of FIG. 6, S464 of FIG. 8), the CPU 132 inactivates the SoftAP (S66 of FIG. 3, S166 of FIG. 5, S266 of FIG. 6, S466 of FIG. 8). This is not limitative, and the CPU 132 may not inactivate the SoftAP after the SoftAP connection between the printer 100 and the terminal apparatus 200 has been disconnected. That is, in the present modification, "changing the operation state of the communication apparatus from the parent state to the specific state after the first IP address has been sent to the external apparatus" may be omitted.

(Modification 3)

In the above first, second, fourth, and fifth embodiments, the CPU 132 sends, using the SoftAPNW, the result screen data including the IPN100 to the terminal apparatus 200 (S60 of FIG. 3, S160 of FIG. 5, S460 of FIG. 8). In the above third embodiment, the CPU 132 sends, using the SoftAPNW, the redirect instruction including the IPN100 to the terminal apparatus 200 (S260 of FIG. 6). The method for the CPU 132 to send the IPN100 to the terminal apparatus 200 may not be limited to these. Therefore, for example, the CPU 132 may send, using the SoftAPNW, a notification signal including the IPN100 to the terminal apparatus 200.

(Modification 4)

In the above first and second embodiments, the CPU 132 receives, from the terminal apparatus 200, the normal AP information WIN input on the input screen (see FIG. 4) displayed by the terminal apparatus 200 (S44 of FIG. 2, S344 of FIG. 7, S444 of FIG. 8). Alternatively, the CPU 132 may receive from the terminal apparatus 200 the normal AP information WIN pre-stored in the terminal apparatus 200. That is, in the present modification, "receiving . . . a first screen request" and "sending . . . second screen data . . . " may be omitted.

(Modification 5)

The Wi-Fi I/F 120 may be incapable of concurrently performing wireless communication according to the SoftAP function and wireless communication using the normal AP connection. In the present modification, the CPU 132 may switch flexibly between the SoftAP connection with the terminal apparatus 200 and the normal AP connection with the normal AP 10 while performing each process for establishing the normal AP connection with the normal AP 10.

(Modification 6)

The CPU 132 may activate the SoftAP, not at the time when the power of the printer 100 is turned on, but at another time (e.g., each time a predetermined period elapses, when a predetermined instruction is inputted, etc.).

(Modification 7)

In the above respective embodiments, the CPU 132 receives the IPN100 determined by the normal AP 10 operating as the DHCP server from the normal AP 10. This is not limitative, and the CPU 132 may not obtain the IPN100 that is the IP address of the printer 100 in the normal APNW from the normal AP 10. For example, the CPU 132 may use a static IP address pre-stored in the printer 100 as the IPN100. Further, the CPU 132 may determine the IPN100 by itself (e.g., may determine an IP address inputted by the user as the IPN100). Generally speaking, in "obtaining a first IP address of the communication apparatus in the second wireless network, the first IP address being not determined by the external apparatus", the first IP address which is the first IP address of the communication apparatus in the second wireless network and not determined by the external apparatus simply needs to be obtained.

(Modification 8)

In the above respective embodiments, the SoftAP information WIS does not include a password. This is not limitative, and the SoftAP information WIS may include a password. In that case, when the connection operation (see S22 of FIG. 2) is performed, the user may input that password to the terminal apparatus 200.

(Modification 9)

In the above respective embodiments, the CPU 132 implements the configuration of starting to operate as the SoftAP each time the power of the printer 100 is turned on (S12 of FIG. 2). Alternatively, when the power of the printer 100 is turned on for the first time after the shipment of the printer 100, the CPU 132 may start operating as the SoftAP, and may not start operating as the SoftAP when the power of the printer 100 is turned on for the second and subsequent times after the shipment of the printer 100 (hereafter, "first configuration"). Further, the CPU 132 may start operating as the SoftAP when the power-on is performed for the first time after initialization of the printer 100, and may not start operating as the SoftAP when the power-on is performed for the second and subsequent times after the initialization of the printer 100 (hereafter, "second configuration"). The CPU 132 may perform both the first configuration and the second configuration, or may perform either of those.

(Modification 10)

The "communication apparatus" may not be limited to the printer 100, but may be a scanner capable of performing scan function. In this case, instead of the print performing unit 116, a scan performing unit is implemented. In another modification, the "communication apparatus" may be an apparatus (e.g., PC, server, mobile terminal (mobile phone, smartphone, PDA, etc.)) that performs a different function from the print function and scan function (e.g., display function, calculation function).

(Modification 11)

In the first and third embodiments, the confirmation screen data (S82 of FIG. 3, S282 of FIG. 6) which the CPU 132 sends to the terminal apparatus 200 may further include a predetermined download URL. The download URL may be a URL for downloading a printer driver program for causing the printer 100 to perform printing, or a print application program. The terminal apparatus 200 may display a download button including a link to that download URL together with the confirmation screen 440 (see FIG. 4). Then, in a case where the download button is operated, the terminal apparatus 200 may execute downloading the above printer driver program (or the print application program). In the second embodiment, the download URL may be included in the JavaScript which the server 300 sends to the terminal apparatus 200 in S176 of FIG. 5. In the fifth embodiment, the download URL may be included in the sending application 242.

(Modification 12)

In the above respective embodiments, the respective processes in FIGS. 2, 3, and 5 to 8 are realized by a software (i.e., program), but alternatively at least one of these processes may be realized by a hardware such as a logic circuit, etc.

What is claimed is:

1. A communication apparatus comprising:
   a processor; and
   a memory storing non-transitory computer-readable instructions therein, the computer-readable instructions, when executed by the processor, causing the communication apparatus to perform:
   constructing a first wireless network to which the communication apparatus and an external apparatus belong and an access point does not belong;
   receiving, from the external apparatus by using the constructed first wireless network, a wireless setting used in a second wireless network, the second wireless network being a network to which the communication apparatus, the external apparatus, and the access point are to belong;
   establishing a wireless connection with the access point by using the received wireless setting;
   obtaining a first Internet Protocol (IP) address of the communication apparatus in the second wireless network, the first IP address being not determined by the external apparatus;
   sending the obtained first IP address to the external apparatus by using the first wireless network after the wireless connection with the access point has been established; and
   receiving a signal from the external apparatus via the access point by using the second wireless network after the first IP address has been sent to the external apparatus, the signal being a signal of which the first IP address is designated as a destination.

2. The communication apparatus as in claim 1, wherein the constructing of the first wireless network includes:
   changing an operation state of the communication apparatus from a specific state to a parent state, the specific state being a state in which the communication apparatus does not operate as a parent station of the first wireless network, the parent state being a state in which the communication apparatus operates as the parent station; and establishing a wireless connection with the external apparatus after the operation state of the communication apparatus has been changed to the parent state.

3. The communication apparatus as in claim 2, wherein the computer-readable instructions, when executed by the processor, cause the communication apparatus to further perform:

changing the operation state of the communication apparatus from the parent state to the specific state after the first IP address has been sent to the external apparatus.

4. The communication apparatus as in claim 1, wherein the obtaining of the first IP address includes obtaining, from the access point after the wireless connection with the access point has been established, the first IP address that is determined by the access point.

5. The communication apparatus as in claim 1, wherein the sending of the obtained first IP address includes sending, to the external apparatus by using the first wireless network, the first IP address and first screen data representing a result screen which indicates that the wireless connection with the access point has been established.

6. The communication apparatus as in claim 5, wherein the sending of the obtained first IP address further includes sending, to the external apparatus by using the first wireless network, a specific URL (abbreviation of Uniform Resource Locator) which the external apparatus is to access in response to a predetermined button in the result screen being operated, and the first IP address is included in a predetermined portion in the specific URL.

7. The communication apparatus as in claim 1, wherein the sending of the obtained first IP address includes sending, to the external apparatus by using the first wireless network, a redirect instruction including a specific URL which the external apparatus is to access, and the first IP address is included in a predetermined portion in the specific URL.

8. The communication apparatus as in claim 1, wherein the computer-readable instructions, when executed by the processor, cause the communication apparatus to further perform:

receiving, from the external apparatus by using the first wireless network, a first screen request in which a second IP address of the communication apparatus in the first wireless network is designated as a destination; and sending, to the external apparatus by using the first wireless network, second screen data representing a designation screen for designating the wireless setting in a case where the first screen request is received, wherein the receiving of the wireless setting includes receiving the wireless setting from the external apparatus by using the first wireless network after the second screen data has been sent to the external apparatus.

9. The communication apparatus as in claim 1, wherein the computer-readable instructions, when executed by the processor, cause the communication apparatus to further perform:

sending a second IP address of the communication apparatus in the first wireless network to the external apparatus by using the first wireless network so as to cause the external apparatus to set the second IP address as an IP address of a DNS (abbreviation of Domain Name System) server;

receiving, from the external apparatus by using the first wireless network, a second screen request in which the second IP address is designated as the IP address of the DNS server; and sending, to the external apparatus by using the first wireless network, second screen data representing a designation screen for designating the wireless setting in a case where the second screen request is received, wherein the receiving of the wireless setting includes receiving the wireless setting from the external apparatus by using the first wireless network after the second screen data has been sent to the external apparatus.

10. A non-transitory computer-readable medium storing computer-readable instructions for a communication apparatus, wherein the computer-readable instructions, when executed by a processor of the communication apparatus, cause the communication apparatus to perform:

constructing a first wireless network to which the communication apparatus and an external apparatus belong and an access point does not belong;

receiving, from the external apparatus by using the constructed first wireless network, a wireless setting used in a second wireless network, the second wireless network being a network to which the communication apparatus, the external apparatus, and the access point are to belong;

establishing a wireless connection with the access point by using the received wireless setting;

obtaining a first Internet Protocol (IP) address of the communication apparatus in the second wireless network, the first IP address being not determined by the external apparatus;

sending the obtained first IP address to the external apparatus by using the first wireless network after the wireless connection with the access point has been established; and receiving a signal from the external apparatus via the access point by using the second wireless network after the first IP address has been sent to the external apparatus, the signal being a signal of which the first IP address is designated as a destination.

11. The non-transitory computer-readable medium storing the computer-readable instructions for the communication apparatus as in claim 10, wherein the constructing of the first wireless network includes:

changing an operation state of the communication apparatus from a specific state to a parent state, the specific state being a state in which the communication apparatus does not operate as a parent station of the first wireless network, the parent state being a state in which the communication apparatus operates as the parent station; and establishing a wireless connection with the external apparatus after the operation state of the communication apparatus has been changed to the parent state.

12. The non-transitory computer-readable medium storing the computer-readable instructions for the communication apparatus as in claim 11, wherein the computer-readable instructions, when executed by the processor, cause the communication apparatus to further perform:
changing the operation state of the communication apparatus from the parent state to the specific state after the first IP address has been sent to the external apparatus.

13. The non-transitory computer-readable medium storing the computer-readable instructions for the communication apparatus as in claim 10, wherein
the obtaining of the first IP address includes obtaining, from the access point after the wireless connection with the access point has been established, the first IP address that is determined by the access point.

14. The non-transitory computer-readable medium storing the computer-readable instructions for the communication apparatus as in claim 10, wherein
the sending of the obtained first IP address includes sending, to the external apparatus by using the first wireless network, the first IP address and first screen data representing a result screen which indicates that the wireless connection with the access point has been established.

15. The non-transitory computer-readable medium storing the computer-readable instructions for the communication apparatus as in claim 14, wherein
the sending of the obtained first IP address further includes sending, to the external apparatus by using the first wireless network, a specific URL (abbreviation of Uniform Resource Locator) which the external apparatus is to access in response to a predetermined button in the result screen being operated, and
the first IP address is included in a predetermined portion in the specific URL.

16. The non-transitory computer-readable medium storing the computer-readable instructions for the communication apparatus as in claim 10, wherein
the sending of the obtained first IP address includes sending, to the external apparatus by using the first wireless network, a redirect instruction including a specific URL which the external apparatus is to access, and
the first IP address is included in a predetermined portion in the specific URL.

17. The non-transitory computer-readable medium storing the computer-readable instructions for the communication apparatus as in claim 10, wherein
the computer-readable instructions, when executed by the processor, cause the communication apparatus to further perform:
receiving, from the external apparatus by using the first wireless network, a first screen request in which a second IP address of the communication apparatus in the first wireless network is designated as a destination; and
sending, to the external apparatus by using the first wireless network, second screen data representing a designation screen for designating the wireless setting in a case where the first screen request is received,
wherein the receiving of the wireless setting includes receiving the wireless setting from the external apparatus by using the first wireless network after the second screen data has been sent to the external apparatus.

18. The non-transitory computer-readable medium storing the computer-readable instructions for the communication apparatus as in claim 10, wherein
the computer-readable instructions, when executed by the processor, cause the communication apparatus to further perform:
sending a second IP address of the communication apparatus in the first wireless network to the external apparatus by using the first wireless network so as to cause the external apparatus to set the second IP address as an IP address of a DNS (abbreviation of Domain Name System) server;
receiving, from the external apparatus by using the first wireless network, a second screen request in which the second IP address is designated as the IP address of the DNS server; and
sending, to the external apparatus by using the first wireless network, second screen data representing a designation screen for designating the wireless setting in a case where the second screen request is received,
wherein the receiving of the wireless setting includes receiving the wireless setting from the external apparatus by using the first wireless network after the second screen data has been sent to the external apparatus.

19. A method performed by a communication apparatus, the method comprising:
constructing a first wireless network to which the communication apparatus and an external apparatus belong and an access point does not belong;
receiving, from the external apparatus by using the constructed first wireless network, a wireless setting used in a second wireless network, the second wireless network being a network to which the communication apparatus, the external apparatus, and the access point are to belong;
establishing a wireless connection with the access point by using the received wireless setting;
obtaining a first Internet Protocol (IP) address of the communication apparatus in the second wireless network, the first IP address being not determined by the external apparatus;
sending the obtained first IP address to the external apparatus by using the first wireless network after the wireless connection with the access point has been established; and
receiving a signal from the external apparatus via the access point by using the second wireless network after the first IP address has been sent to the external apparatus, the signal being a signal of which the first IP address is designated as a destination.

* * * * *